(12) United States Patent
Gyobu

(10) Patent No.: US 8,810,869 B2
(45) Date of Patent: Aug. 19, 2014

(54) IMAGE READING APPARATUS, IMAGE FORMING APPARATUS, IMAGE READING METHOD AND COMPUTER READABLE INFORMATION RECORDING MEDIUM

(75) Inventor: Yoshikazu Gyobu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 24 days.

(21) Appl. No.: 13/610,041

(22) Filed: Sep. 11, 2012

(65) Prior Publication Data

US 2013/0070311 A1 Mar. 21, 2013

(30) Foreign Application Priority Data

Sep. 16, 2011 (JP) ................................. 2011-203735

(51) Int. Cl.
*H04N 1/04* (2006.01)
(52) U.S. Cl.
USPC ............ 358/474; 358/496; 358/498; 358/406
(58) Field of Classification Search
USPC .......................... 358/474, 496, 498, 406, 1.9
See application file for complete search history.

(56) References Cited

U.S. PATENT DOCUMENTS

2008/0013785 A1 1/2008 Gyobu
2011/0188091 A1* 8/2011 Watanabe et al. ............. 358/448

FOREIGN PATENT DOCUMENTS

JP 2010-034751 2/2010

\* cited by examiner

*Primary Examiner* — Houshang Safaipour
(74) *Attorney, Agent, or Firm* — Harness, Dickey & Pierce, P.L.C.

(57) ABSTRACT

An image reading apparatus includes a reading part reading front and back sides of an original; a storage part storing the thus read images and plural processing parameters to be used for image processing; and an image processing part carrying out the image processing on the read images using the plural processing parameters. The image processing part analyzes an image transfer instruction that is an instruction to transmit the read image from the first storage part to the image processing part, and determines which of the processing parameters is to be used for the read image; and transfers the determined processing parameter by a direct memory access transfer method. The processing parameter concerning the read image is transferred from the first storage part to the image processing part by the direct memory access transfer method prior to the image processing of the read image by the image processing part.

9 Claims, 11 Drawing Sheets

IMAGE READING APPARATUS, IMAGE FORMING APPARATUS, IMAGE READING METHOD AND COMPUTER READABLE INFORMATION RECORDING MEDIUM

BACKGROUND OF THE INVENTION

1. Field of the Invention

The present invention relates to an image reading apparatus, an image forming apparatus, an image reading method and a computer readable information recording medium.

2. Description of the Related Art

In a case where a scanner part of a MultiFunction Peripheral (MFP) reads an original, improvement of the specification of the reading speed is demanded. When an original is read, processes are carried out, i.e., the image of the original is read by the scanner part, an image processing part carries out image processing and compresses the thus obtained image, and a controller stores the thus processed image in a secondary storage device such as a HDD. It is necessary to carry out the flow of the sequence of these processes within a short period of time.

For example, in such a MFP, a technology is already put into practice. In the technology, in order to reduce a period of time required for reading both sides of an original, the both sides of the original are read simultaneously, and the thus obtained image data is stored in a page memory. Thereafter, the images are read from the page memory for the respective sides of the original, side by side. Then, image processing is carried out on the thus read images by the image processing part, and the controller carries out subsequent processes.

In such a MFP that can carry out reading both sides of an original simultaneously, there is a case where a sensor used for reading the front side and a sensor used for reading the back side are different. In this case, because of a difference between the respective image reading devices for the front side and the back side, a processing parameter(s) used for shading correction (white level correction), black correction (black level correction) and/or the like is(are) different between the processing for the front side and the processing for the back side. Thus, it is necessary to change the processing parameter(s) depending on image data of the front side and image data of the back side.

For this purpose, the image processing part reads the processing parameter(s) from the page memory, and carries out image processing using the thus obtained processing parameter(s). As a specific procedure, first, original images are read, and are stored in the page memory. In parallel to the image reading operation, an image transfer instruction is provided for transferring the front side of the read image from the page memory to the image processing part. Based on the image transfer instruction, the processing parameter(s) for the front side is(are) read out from the page memory, and the image processing part obtains the read processing parameter(s). Thereafter, the front side of the read image is read out from the page memory, is transferred to the image processing part, the image processing part carries out image processing using the processing parameter(s) for the front side that has(have) been previously obtained, and outputs the processing result.

Thereafter, for the back side, in the same or a similar procedure, an image transfer instruction is provided, and the processing parameter(s) for the back side is(are) transmitted to the image processing part. The image processing part thus obtains the processing parameter(s) for the back side as a substitute for the processing parameter(s) for the front side that has been stored. After the read image of the back side is transferred to the image processing part, the image processing part carries out image processing using the obtained processing parameter(s) for the back side, and outputs the processing result.

However, the period of time required for obtaining the processing parameter(s) is fixed. Thus, a reduction of the period of time required from the reading of an original(s) to the outputting has limitations even when the reading of the original images, the image processing by the image processing part, the processes from the compressing of the image data to the storing of the image data in the secondary storage device are speeded up. That is, there may be a problem of the period of time required for obtaining the processing parameter(s) as a bottleneck although the reading speed is improved by scanning both sides simultaneously.

In order to solve the problem, a technology is already known in which image data of two sheets of originals is stored in a page memory, and the number of times of switching the parameter(s) is halved. Specifically, a low resolution mode is provided in which an image is read in a resolution lower than the related art. In the usual mode, image data of the front and back sides of one sheet is stored in the page memory. In contrast thereto, in the low resolution mode, image data of the front and back sides of two sheets is stored in the page memory. Then, after the processing parameter(s) for the front side is(are) obtained, the read image of the front side of the first sheet is transferred, subsequently the read image of the front side of the second sheet is transferred, and image processing is carried out. After the image data of the front sides of the two sheets are thus transferred, the processing parameter(s) for the back side is(are) obtained, the read image of the back side of the first sheet is transferred, subsequently the read image of the back side of the second sheet is transferred, and image processing is carried out. Thus, the read images of the two sheets of the originals are transferred in the order of: the front side, the front side, the back side and then, the back side. Thus, only the two times of obtaining the processing parameter(s) are required in this technology whereas the four times of obtaining the processing parameter(s) are required in the related art. Thus, it is possible to reduce the number of times of switching the processing parameter(s) (see Patent Reference No. 1 (Japanese Laid-Open Patent Application No. 2010-34751).

However, according to this technology of Patent Reference No. 1, in a case where a user does not wish the low resolution mode, the read image of the front side of the first sheet is transferred after the processing parameter(s) for the front side is(are) obtained, and then, the read image of the back side is transferred after the processing parameter(s) for the back side is(are) obtained, as in the related art. Thus, in this case, the same as in the related art, the transfer of the read image is carried out after the processing parameter(s) is(are) obtained, and thus, it is not possible to reduce the period of time required from the image reading to the outputting.

SUMMARY OF THE INVENTION

According to one aspect, an image reading apparatus includes a reading part that reads front and back sides of a sequence of originals; a first storage part that stores read images that are thus read and plural processing parameters to be used for image processing of the read images; and an image processing part that carries out the image processing on the read images using the plural processing parameters. The image processing part includes a parameter analysis part that analyzes an image transfer instruction that is an instruction to transmit the read image from the first storage part to the image processing part, and determines which of the processing parameters is to be used for the read image; and a DMA transfer control part that transfers the processing parameter thus determined by the parameter analysis part by a Direct Memory Access (DMA) transfer method. The DMA transfer control part thus transfers the processing parameter concerning the read image from the first storage part to the image processing part by the DMA transfer method prior to the image processing of the read image by the image processing part.

Other objects, features and advantages of the present invention will become more apparent from the following detailed description when read in conjunction with the accompanying drawings.

DETAILED DESCRIPTION OF THE EMBODIMENTS (First Embodiment)

Figure 1:
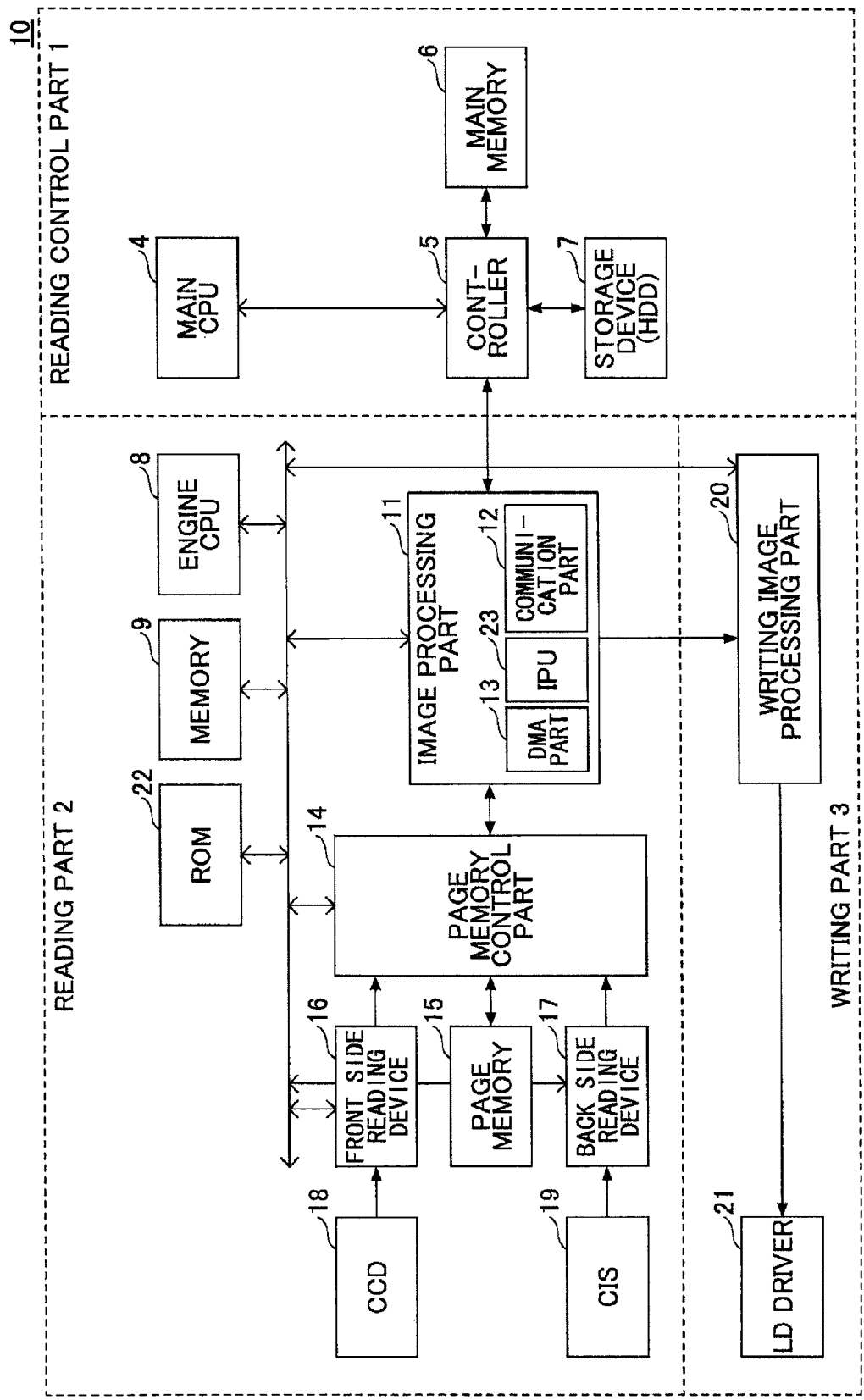
FIG. 1 is an overall module diagram of an image reading apparatus.

Below, a first embodiment of the present invention will be described. FIG. 1 is an overall module diagram of an image reading apparatus 10. It is noted that, below, for the purpose of convenience of explanation, certain elements of the image reading apparatus 10 will be described.

(Functions of Reading Control Part 1, Reading Part 2 and Writing Part 3)

The image reading apparatus 10 includes a reading control part 1, a reading part 2 and a writing part 3. The image reading apparatus 10 is a MultiFunction Peripheral (MFP) that has a common scanning function. In the image reading apparatus 10, the reading control part 1 provides an instruction to the reading part 2 to read an image(s) of an original(s). The reading part 2 simultaneously reads the front side and the back side of an original according to the instruction, carries out image processing depending on respective reading devices for the front side and the back side on the read images, and outputs the processing results. The writing part 3 carries out, if necessary, processing on the images that are output from the reading part 2, and forms corresponding images on a recording sheet(s). Further, the images that are output from the reading part 2 are, if necessary, transmitted to the reading control part 1, are stored in a storage device, or are printed through the writing part 3.

(Internal Configuration and Functions of Reading Control Part 1)

As shown in FIG. 1, the reading control part 1 includes a main CPU 4, a controller 5, a main memory 6 and a storage device (HDD) 7, and controls the reading part 2 and the writing part 3. The main CPU 4 controls the entirety of the image reading apparatus 10, and provides instructions to read an image(s) to the controller 5. The controller 5 transmits commands to the reading part 2, and thus, provides instructions, and provides necessary information to the reading part 2. The main memory 6 receives an instruction to start a program from the controller 5, reads the program required for reading images from the storage device (HDD) 7, and stores it. Also the program required for reading images is read out from the storage device (HDD) 7, and is stored in the main memory 6. In the storage device (HDD) 7, not only the program required for reading images is installed, but also read images on which image processing has been carried out are stored, and so forth.

(Internal Configuration and Functions of Reading Part 2)

The reading part 2 includes an engine CPU 8, a memory 9, a ROM 22, an image processing part 11, a page memory control part 14, a page memory 15, a front side reading device 16, a back side reading device 17, a Charge Coupled Device (CCD) 18 and a Contact image Sensor (CIS) 19. The image processing part 11 includes a communication part 12 and a Direct Memory Access (DMA) part 13 and an Image Processing Unit (IPU) 23, and carries out image processing on read images.

The engine CPU 8 carries out detailed control of the reading part 2 in response to an image reading instruction given by the main CPU 4. The main CPU 4 provides an abstract instruction such as "to obtain an image of the front side" or "to obtain an image of the back side", and the engine CPU 8 carries out detailed control of the reading part 2 according to the abstract instruction. The memory 9 stores a program to be used for carrying out processing carried out by the engine CPU 8. The ROM 22 stores processing parameters to be used for the image processing. The processing parameters are read at a time of starting power supply to the image reading apparatus 10, and are stored in the page memory 15.

The image processing part 11 carries out the necessary image processing on read images. The communication part 12 stores commands that are instructions which are output from the controller 5, and analyzes the commands, if necessary. The communication part 12 stores commands that are output from the engine CPU 8 to the reading control part 1. The IPU 23 carries out the image processing on the read images transferred from the page memory 15. The DMA part 13 carries out a transfer of the processing parameter(s) as a result of being controlled by the communication part 12 or the engine CPU 8.

The page memory control part 14 controls inputting to and outputting from the page memory 15 the read images or the processing parameters. The page memory 15 stores not only the read images that are input from the front side reading device 16 and the back side reading device 17, but also the processing parameters that are read out from the ROM 22 at a time of starting the power supply, and reads out them if necessary as a result of being controlled by the page memory control part 14. The CCD 18 is an image sensor that converts light from a white fluorescent lamp into an electric signal. The front side reading device 16 reads the front side of an original using the CCD 18, and stores the read image in the page memory 15. The CIS 19 uses RGB light emitting diodes and is a sensor having light sources and lenses which are integrated thereto. The back side reading device 17 reads the back side of the original using the CIS 19, and stores the read image in the page memory 15.

The CCD 19 and the CIS 19 have different reading characteristics therebetween, and thus, different types of image processing should be carried out on the corresponding read images. For example, image processing is carried out depending on the reading characteristics for shading correction (white level correction), black correction (black level correction) and/or the like. Thus, different processing parameters should be obtained for a front side read image and a back side read image, respectively.

(Internal Configuration and Functions of Writing Part 3)

The writing part 3 includes a writing image processing part 20 and a Laser Diode (LD) driver 21. The writing image processing part 20 carries out image processing, which is necessary for writing, on the read images on which the IPU 23 has carried out image processing, and carries out a writing process on the LD driver 21 to drive laser diodes to form images on photosensitive members (described later using FIG. 11).

(Operations of Reading Control Part 1, Reading Part 2 and Writing Part 3)

In the first embodiment, the image reading apparatus 10 carries out certain operations (i) at a time of starting up, (ii) at a time of providing an instruction to read images and (iii) at a time of providing an instruction to transfer the images. Below, the operations at these three timings will be described.

((i) At Time of Starting Up)

When the image reading apparatus 10 is started up, processing parameters for image processing previously stored in the ROM 22 are transferred in a DMA transfer method by the DMA part 13 as a result of being controlled by the engine CPU 8, and are stored in the page memory 15 via the page memory control part 14.

((ii) At Time of Providing Instruction to Read Images)

When a user inputs an instruction to read images to the image reading apparatus 10, an image reading instruction is provided to the reading part 2 from the reading control part 1. In response to the image reading instruction, the front side reading device 16 reads the front side of an original using the CCD 18 which is the sensor. Simultaneously with the reading the front side, the back side reading device 17 reads the back side of the original using the CIS 19 that is the sensor. The thus read images are stored in the page memory 15 via the page memory control part 14.

((iii) At Time of Providing Instruction to Transfer Images)

Next, image transfer instructions are provided from the reading control part 1 to the reading part 2 to transmit the read images thus stored in the page memory 15 to the image processing part 11. The image transfer instruction for the read image of the front side is provided first. In response to the image transfer instruction for the front side, a processing parameter(s) to be used for image processing of the front side is(are) transmitted and set in the image processing part 11. Next, the read image of the front side is transferred to the image processing part 11.

As a specific instruction procedure, the image transfer instruction is provided by the controller 5 that is controlled by the main CPU 4, and the communication part 12 stores the command that is the image transfer instruction in a register. The communication part 12 analyzes the stored command, and determines that the command is the image transfer instruction for the read image of the front side. The communication part 12 controls the DMA part 13, reads the processing parameter(s) for the front side, and transfers the processing parameter(s) for the front side to the IPU 23 by the DMA transfer method. The transferred processing parameter(s) for the front side is(are) stored in a register that is included in the IPU 23. Further, the engine CPU 8 detects the image transfer instruction, and the engine CPU 8 reads the read image of the front side from the page memory 15 via the page memory control part 14 and transmits the read image of the front side to the IPU 23.

(Image Processing and Outputting)

The IPU 23 that has thus obtained the processing parameter(s) for the front side and the read image of the front side carries out image processing on the read image of the front side using the processing parameter(s) for the front side that has(have) been thus stored, and, if necessary, transmits the thus processed image to the reading control part 1 or the writing part 3.

After the transfer of the read image of the front side to the image processing part II is finished, the main CPU 4 detects the finish of the transfer, and provides the image transfer instruction for the back side from the controller 5. The same as or similar to the above-mentioned case of providing the image transfer instruction for the front side, the communication part 12 transfers the processing parameter(s) for the back side to the IPU 23 from the page memory 15 by the DMA transfer method. The engine CPU 8 reads the read image of the back side from the page memory 15 to the image processing part 11, and the IPU 23 carries out image processing on the read image of the back side using the processing parameter(s) for the back side, and transmits the thus processed read image to the reading control part 1 or the writing part 3.

Thus, the communication part 12 analyzes the image transfer instruction that is provided by the controller 5, and transfers, by the DMA transfer method, the processing parameter(s) corresponding to the image transfer instruction to the image processing part 11 from the page memory 15. The transfer by the DMA transfer method is carried out as a result of being controlled by the image processing part 11, and the engine CPU 8 is not directly involved in the setting of the processing parameter(s). By this configuration, it is possible to reduce the period of time required for setting the processing parameter(s).

(Variant of First Embodiment)

It is noted that, according to the first embodiment, at a time of starting up the image reading apparatus 10, the processing parameters stored in the ROM 22 are transferred to the page memory 15 in the DMA transfer method by the DMA part 13. However, the processing parameters may be transferred in a DMA transfer method by a DMA part (not shown) that the engine CPU 8 has. Further, it is also possible that, as in the related art, no DMA part is used, and the engine CPU 8 transmits the processing parameters. In this case, the engine CPU 8 gives an instruction to write the processing parameters to the page memory control part 14, and the page memory control part 14 stores the processing parameters in the page memory 15 according to the given instruction.

(Overall Processing Flow)

Figure 2:
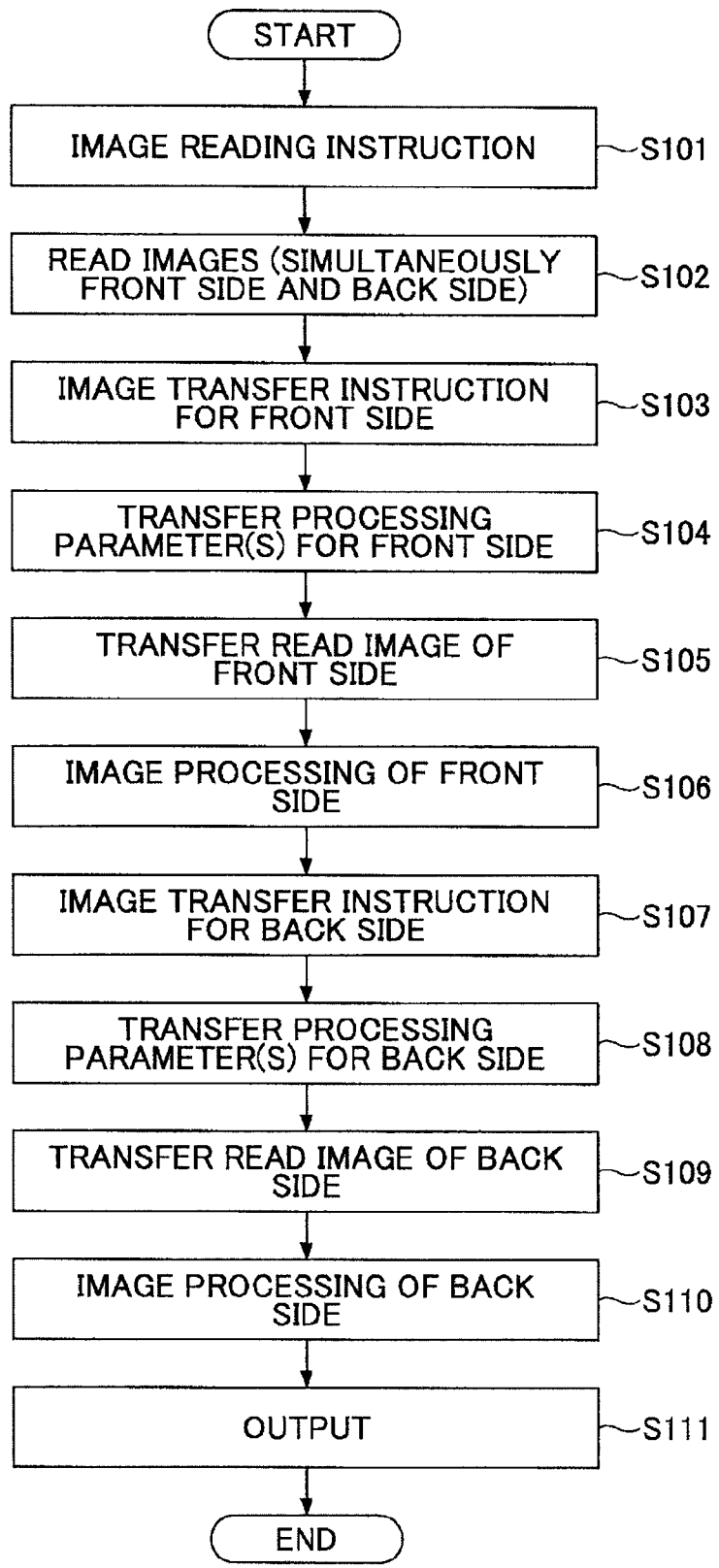
FIG. 2 is a flowchart concerning a processing flow of the image reading apparatus.

Next, a flow of processing of the image reading apparatus 10 will be described. FIG. 2 is a flowchart concerning a processing flow of the image reading apparatus 10.

A user inputs a reading instruction to the image reading apparatus 10. In step S101, based on the reading instruction, the main CPU 4 provides an image reading instruction from the controller 5. In response to the image reading instruction, the engine CPU 8 provides an instruction to read images to the front side reading device 16 and the back side reading device 17 according to the image reading instruction. In step S102, the front side and the back side of an original are read simultaneously by the front side reading device 16 and the back side reading device 17. The thus obtained read images are stored in the page memory 15.

After the image reading instruction, the main CPU 4 provides an image transfer instruction for the read image of the front side from the controller in step S103. The communication part 12 that is included in the image processing part 11 stores the command that is the image transfer instruction provided by the controller 5, and the communication part 12 interprets the stored command as the image transfer instruction for the front side. In step S104, the communication part 12 controls the DMA part 13, and transfers the processing parameter(s) for the front side from the page memory 15 to the IPU 23 by the DMA transfer method. In step S105, the read image of the front side is transferred to the IPU 23 from the page memory 15. In step S106, the IPU 23 carries out image processing on the read image of the front side using the processing parameter(s) that has(have) been thus transferred by the DMA transfer method.

When the transfer of the read image of the front side is thus finished, the page memory control part 14 provides an interrupt to the engine CPU 8. A notification of the interrupt is sent to the main CPU 4 from the engine CPU 8, and the controller 5 provides an image transfer instruction for the back side. The communication part 12 analyzes the image transfer instruction in step S107, reads the processing parameter(s) for the back side from the page memory 15 in step S108, and transfers the read processing parameter(s) to the IPU 23 by the DMA transfer method. In step S109, the read image of the back side is transferred from the page memory 15 to the IPU 23, and the IPU 23 carries out image processing on the read image of the back side in step S110 using the processing parameter(s) that has(have) been thus transferred by the DMA transfer method. Thereafter, in step S111, the read images of the front side and the back side on which the image processing has been thus carried out are output.

Thus, in the processing flow from the reading the images to the outputting, the communication part 12 analyzes the image transfer instructions, and transfers the processing parameters of the read images, respectively, by the DMA transfer method. Thus, the period of time required for the sequence of the processing is reduced.

(Internal Configuration and Functions of Page Memory Control Part 14)

Figure 3:
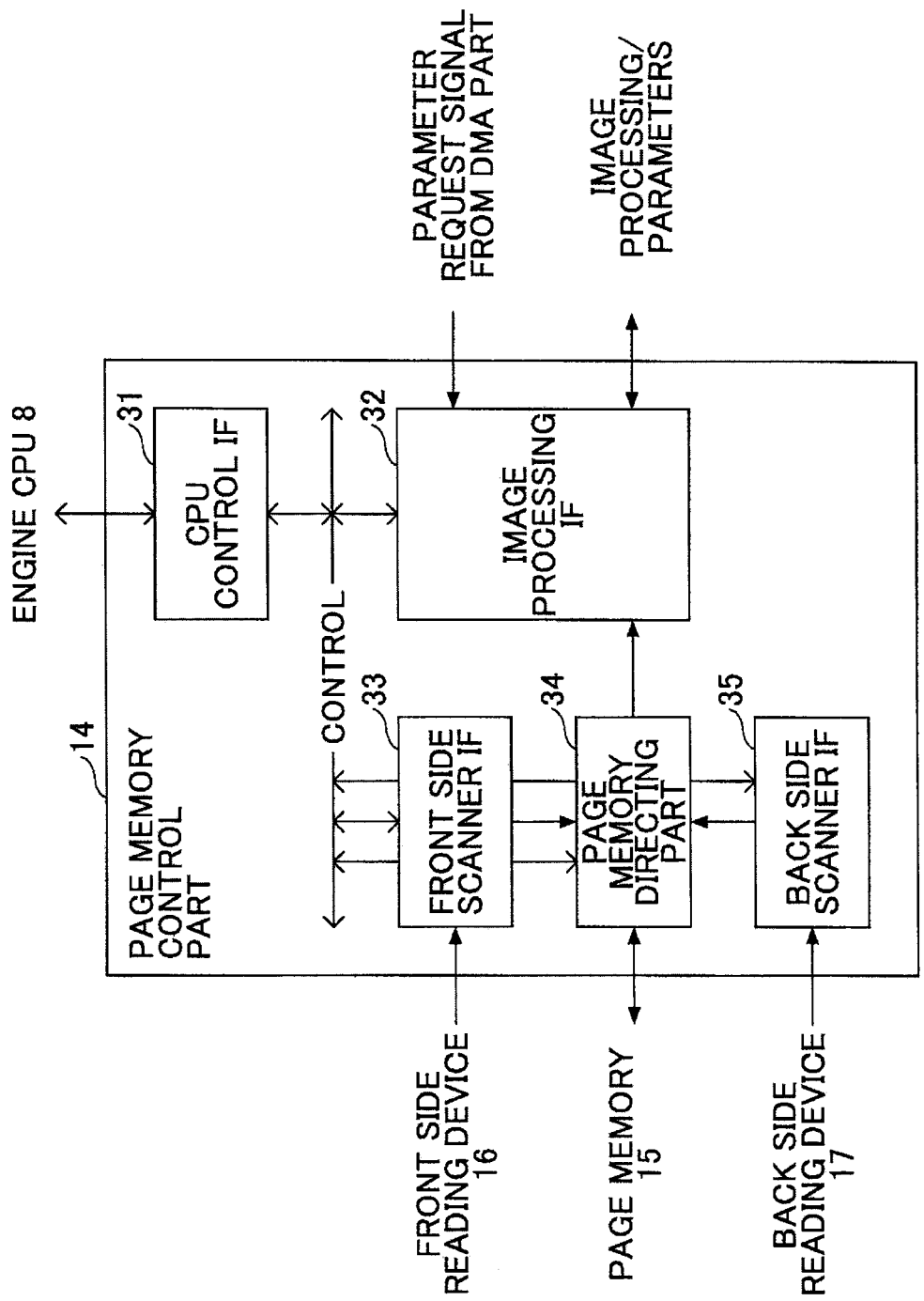
FIG. 3 is an internal configuration diagram of a page memory control part.

Below, the internal configuration and functions of the page memory control part 14 will be described. FIG. 3 is an internal configuration diagram of the page memory part 14.

The page memory control part 14 includes a CPU control IF 31, an image processing IF 32 also acting as a parameter transfer IF, a front side scanner IF 33, a page memory directing part 34 and a back side scanner IF 35. The page memory control part 14 carries out control of inputting and outputting of the image data and the processing parameters of the page memory 15. The page memory directing part 34 carries out control of inputting to and outputting from the page memory 15. The front side scanner IF 33 provides the read image of the front side, which is input from the front side reading device 16, to the page memory directing part 34. Similarly, the back side scanner IF 35 provides the read image of the back side, which is input from the back side reading device 17, to the page memory directing part 34.7

The image processing IF 32 acts as an interface of the page control part 14 for the image processing part 11, and provides the read images to the image processing part 11. Further, the image processing IF 32 receives a request for the processing parameter(s) from the image processing part 11, and provides the processing parameter(s) received from the page memory directing part 34 to the image processing part 11. Further, the image processing IF 32 provides the processing parameters provided by the DMA part 13 at a time of starting the power supply to the page memory directing part 34. The CPU control IF 31 acts as an interface of the page memory control part 14 for the engine CPU 8 and receives the transfer instructions for the read images to the image processing part 11. Further, in a case where the DMA 13 is not used for the transfer of the processing parameter(s), the CPU control IF 31 provides the processing parameter(s) to the engine CPU 8, or receives the processing parameter(s) from the engine CPU 8.

(Operations of Page Memory Control Part 14)

Operations of the page memory control part 14 will be described for (i) a time of starting up, (ii) a time of providing an instruction to read images and (iii) a time of providing an instruction to transfer an image.

((i) At Time of Starting Up)

When the image reading apparatus 10 is started up, the processing parameters read out from the ROM 22 are stored in the page memory 15. At this time, the transfer of the processing parameters is carried out by any one of three patterns, i.e., A) a case of the transfer using the DMA part 13, B) a case of the transfer using a DMA part that is included in the engine CPU 8 and C) a case of the transfer using no DMA part.

A) In a case of using the DMA part 13, at a time of starting the power supply, the DMA part 13 transfers by the DMA transfer method the processing parameters from the ROM 22 to the page memory 15 as a result of being controlled by the engine CPU 8.

B) In a case of using a DMA part that the engine CPU 8 has, a DMA control part of the engine CPU 8 transfers the processing parameters from the ROM 22 to the page memory 15 by the DMA transfer method.

C) In a case of using no DMA part, the engine CPU 8 reads the processing parameters from the ROM 22, and sends a writing request to the page memory control part 14. The page memory control part 14 receives the writing request from the CPU control IF 31, and the page memory directing part 34 stores the processing parameters, which is input from the engine CPU 8, in the page memory 15.

((ii) At Time of Providing Instruction to Read Images)

Based on an image reading instruction, front side and back side images that are read simultaneously by the front side reading device 16 and the back side reading device 17 are sent to the page memory directing part 34 from the front side scanner IF 33 and the back side scanner IF 35, and are stored in the page memory 15. After the page memory directing part 34 detects an input of a predetermined number of lines (for example, 5 lines) of the read image(s), the page memory directing part 34 provides an interrupt to the engine CPU 8 via the CPU control IF 31.

((iii) At Time of Giving Instruction to Transfer Image)

After an image transfer instruction for the read image of the front side is provided by the controller 5, the communication part 12 determines the processing parameter(s) necessary for image processing for the front side. The image processing IF 32 also acting as the parameter transfer IF receives a processing parameter reading request from the DMA part 13, and the page memory directing part 34 reads out the predetermined processing parameter(s) from the page memory 15, and transmits the read processing parameter(s) to the DMA part 13.

The engine CPU 8 detects the interrupt of the inputting of the predetermined number of lines of the read image(s), and gives an instruction via the CPU control IF 31 to transfer the read image of the front side to the image processing part 11. At this time, the transfer of the processing parameter(s) for the front side from the page memory 15 by the DMA transfer method has been already finished. Based on the instruction, the page memory directing part 34 reads out the read image of the front side from the page memory 15, and transmits the read image of the front side to the image processing part 11 from the image processing IF 32. The same or similar processing is carried out also for the back side.

By thus using the DMA transfer method for reading and transmission of the processing parameters from the page memory 15, it is possible to reduce the period of time required for setting the processing parameters.

(Internal Configuration and Functions of image Processing Part 11)

Figure 4:
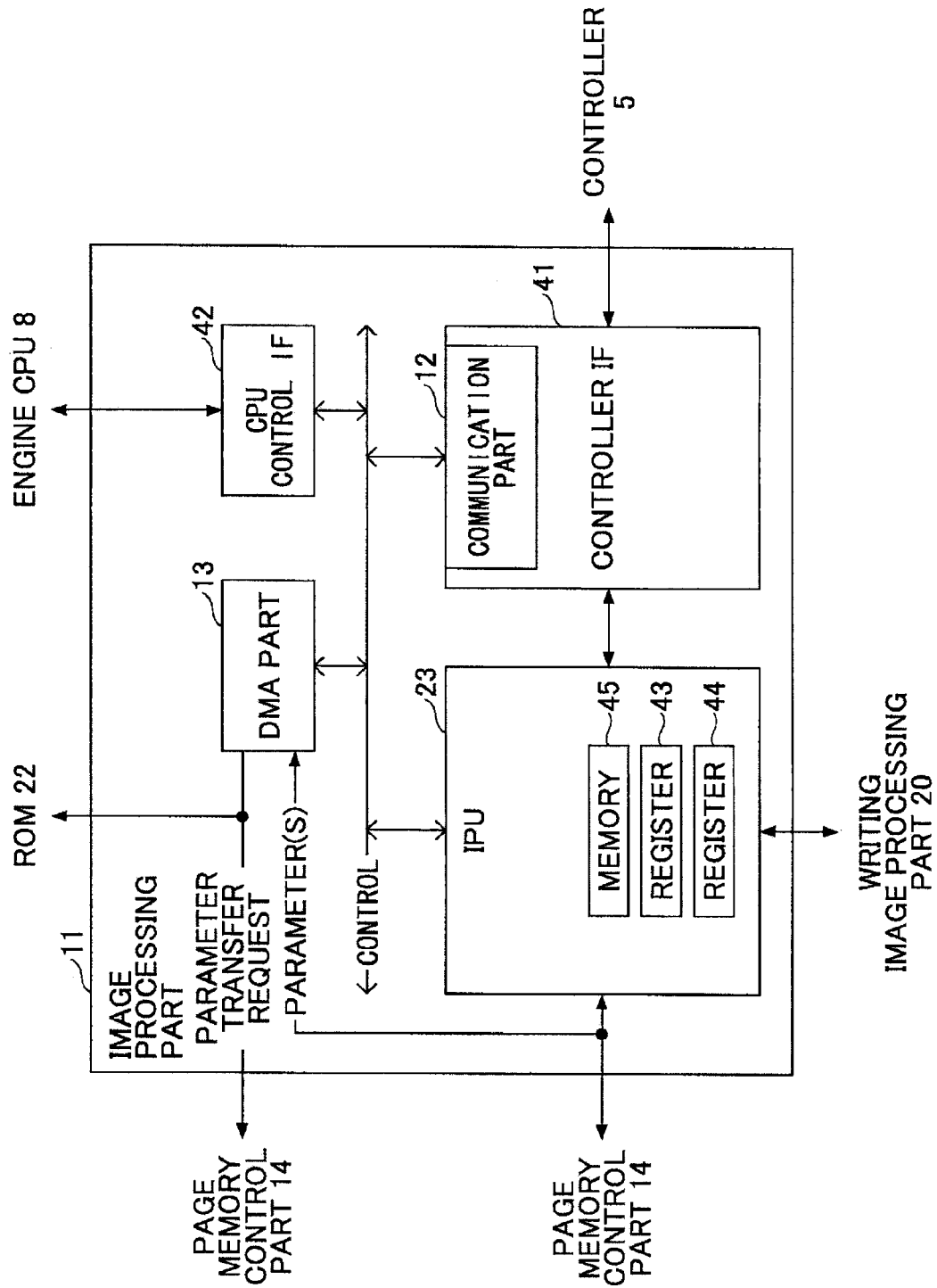
FIG. 4 is an internal configuration diagram of an image processing part.

Next, the internal configuration and functions of the image processing part 11 will be described. FIG. 4 is an internal configuration diagram of the image processing part 11.

The image processing part 11 includes, in addition to the DMA part 13 and the IPU 23, a controller IF 41 and a CPU control IF 42. The communication part 12 is a part of the controller IF 41. The IPU 23 includes a register 43 to be used for storing the processing parameter(s), and a memory 45 that stores a transferred read image. According to a second embodiment described later, in addition to the register 43, a register 44 is provided, and the processing parameters are stored in parallel using the registers 43 and 44. Details thereof will be described later.

The image processing part 11 carries out necessary image processing on read images as a result of being controlled by the engine CPU 8. The DMA part 13 carries out a transfer of the processing parameter(s) between the page memory 15 and the register 43. The internal configuration of the DMA part 13 will be described later. The CPU control IF 42 acts as an interface between the engine CPU 8 and the image processing part 11. A Peripheral Component Interconnect (PCI) Express is used in the controller IF 41, and the controller IF 41 receives an instruction from the controller 5. A command that is an instruction from the controller 5 is stored in an internal register of the communication part 12, and the communication part 12 analyzes the command. Further, the controller IF 41 sends an instruction from the engine CPU 8 to the controller 5. A command that is provided by the engine CPU 8 is stored in the internal register of the communication part 12, is sent to the controller 5, and thus, information is transferred therebetween. Details thereof will be described later.

The IPU 23 carries out various sorts of image processing on a read image. Specifically, image processing required due to differences in the reading characteristics between the front side and the back side, for example, shading correction (white level correction) and/or black correction (black level correction) is carried out by the IPU 23. Further, image processing common to the front side and the back side such as filtering, gradation processing, resolution conversion, and/or the like, is carried out by the IPU 23. The IPU 23 stores the processing parameter(s) that has(have) been transferred by the DMA transfer method from the page memory 15 in the register 43, and carries out the image processing on the read image according to the stored processing parameter(s).

(Operations of Image Processing Part 11)

Operations of the image processing part 11 are carried out in a flow of (i) an image transfer instruction for the front side, (ii) analysis of the image transfer instruction, (iii) processing parameter transfer for the front side, (iv) read image transfer for the front side, (v) image processing for the front side, and then, (vi) from an image transfer instruction for the back side to image processing for the back side.

(i) First, an image transfer instruction for a read image of the front side is provided by the controller 5. A command that is the image transfer instruction is stored in the communication part 12. (ii) The communication part 12 detects the command, and determines that the command is the image transfer instruction for the read image of the front side. Based on the determination, (iii) the processing parameter(s) for the front side is(are) transferred. That is, the communication part 12 determines the processing parameter(s) necessary for image processing of a read image of the front side, controls the DMA part 13 and sends a request to read out the suitable processing parameter(s) to the page memory control part 14. The processing parameter(s) that is(are) thus read out from the page memory 15 is(are) received by the DMA part 13, and is(are) set in the register 43 of the IPU 23 via an internal control bus.

After the processing parameter(s) for the front side is(are) thus transferred, (iv) the read image of the front side is transferred. That is, the read image of the front side which is sent from the engine CPU 8 via the CPU control IF 42 is received by the IPU 23, and is stored in the memory 45. (v) image processing for the front side is carried out on the stored read image of the front side. The processing parameter(s) for the front side stored in the register 43 is(are) used for the image processing. The IPU 23 outputs the image data thus obtained from the image processing to the controller 5 via the controller IF 41.

When the transfer of the read image of the front side has been finished, an interrupt is provided from the page memory control part 14 to the engine CPU 8, and a corresponding notification is sent to the main CPU 4 from the engine CPU 8. In response to the notification, (iv) the main CPU 4 provides an image transfer instruction for the back side from the controller 5. The communication part 12 stores and analyzes the command that is the image transfer instruction for the back side, and transfers by the DMA transfer method the processing parameter(s) necessary for image processing for the back side from the page memory 15 to the register 43. After the transfer of the processing parameter(s) for the back side, the read image of the back side is read out from the page memory 15, and is stored in the memory 45. The IPU 23 carries out image processing on the read image of the back side using the processing parameter(s) stored in the register 43, and outputs the image data obtained from the image processing to the controller 5 via the controller IF 41.

In the related art, setting of processing parameter(s) necessary for image processing is carried out by an engine CPU to access a register that is included in an image processing part. For the accessing the register of the image processing part by the engine CPU, 4 cycles of writing accessing and 9 cycles of reading accessing are required, and generally speaking, the frequency is on the order of 25 MHz through 70 MHz. Thus, a period of time of 57 μsec through 160 μsec is required for one register setting. A large amount of register settings such as those of a lookup table are required in the image processing part, and thus, a period of time of 57 μsec through 160 μsec is required for a register setting of 1 K words, for example.

Thus, according to the first embodiment, the communication part 12 analyzes an image transfer instruction from the controller 5 using hardware, and transfers by the DMA transfer method the processing parameter(s) to be set in the image processing part 11. Assuming that the frequency of a storage device that stores the processing parameter(s) is on the order of 100 MHz, a period of time on the order of 10 μsec is required for one register when the DMA part 13 carries out the transfer in a burst transfer mode. Thus, in the above-mentioned example of register setting of 1 K words, merely a period of time on the order of 10 μsec is required. By causing the communication part 12 to interpret the image transfer instruction provided by the controller 5, and setting the processing parameter(s) in the image processing part 11 by the DMA transfer method, it is possible to reduce the period of time required for setting the processing parameter(s), and reduce the period of time required from the reading to the outputting.

(Variant of First Embodiment)

It is noted that according to the first embodiment, the DMA part 13 provides a request to read the suitable processing parameter(s) to the page memory control part 14 as a result of being controlled by the communication part 12. However, it is also possible that the engine CPU 8 controls the DMA part 13 via the CPU control IF 42. Thus, the reading out of the processing parameter(s) can be carried out even when the control of the communication part 12 has a problem. It is also possible that a DMA part of the engine CPU 8 is used to read out the processing parameter(s).

Further, although the read image on which the image processing has been carried out is output to the controller 5 in the first embodiment, it is also possible that the read image on which the image processing has been carried out is output to the writing image processing part 20 as mentioned above.

(Internal Configuration and Functions of Communication Part 12)

Figure 5:
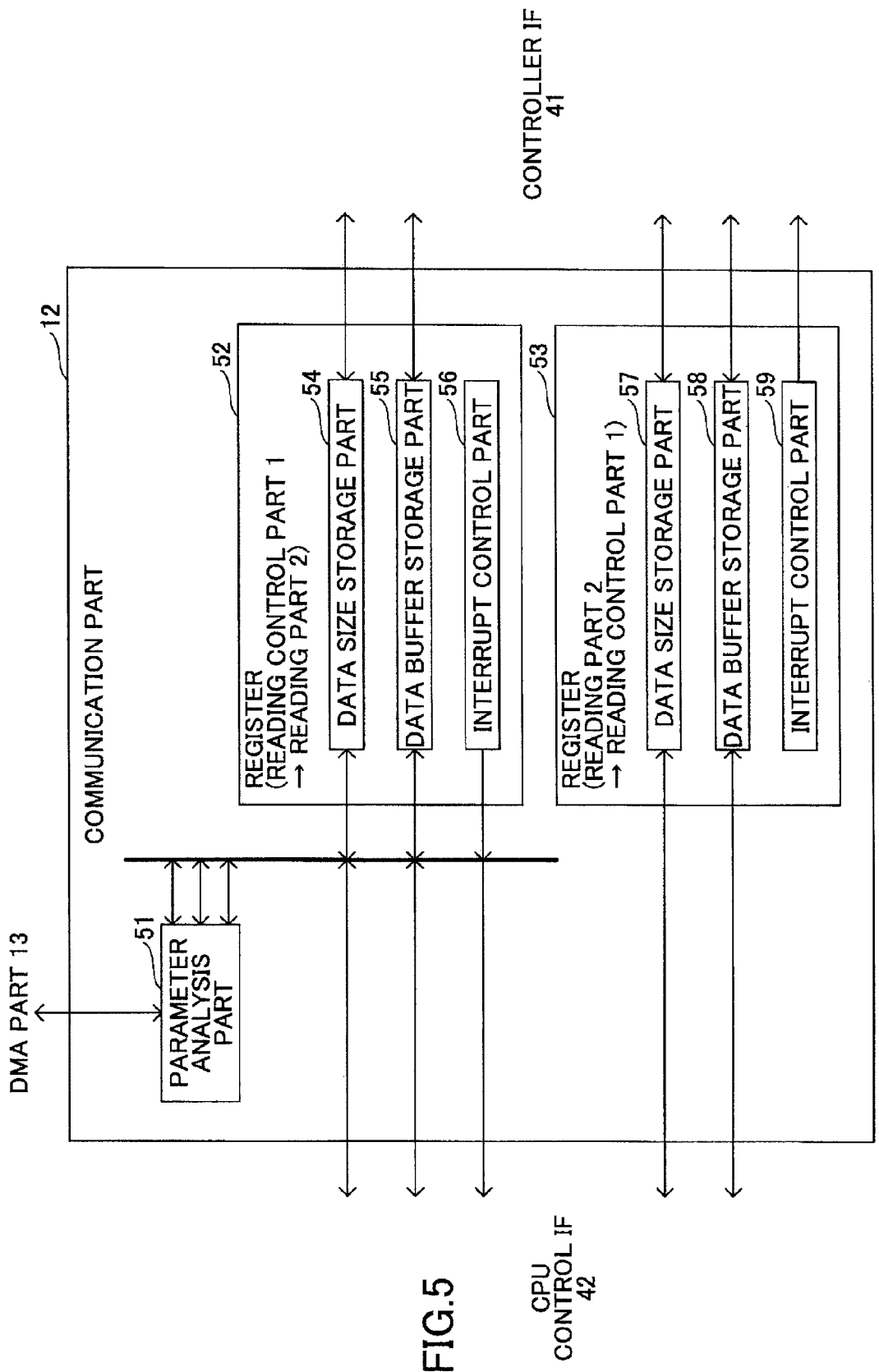
FIG. 5 is a functional block diagram of a communication part.

Below, functions of the communication part 12 will be described. FIG. 5 is a functional block diagram of the communication part 12.

The communication part 12 includes a parameter analysis part 51, a register 52 that stores information from the reading control part 1 to the reading part 2 and a register 53 that stores information from the reading part 2 to the reading control part 1. The register 52 includes a data size storage part 54, a data buffer storage part 55 and an interrupt control part 56. The register 53 includes a data size storage part 57, a data buffer storage part 58 and an interrupt control part 59.

The communication part 12 stores a command that is an instruction that is output from the main CPU 4 via the controller 5 or an instruction that is output from the engine CPU 8, and the parameter analysis part 51 analyzes the command if necessary. In the register 52, the command that is an instruction that is output from the controller 5 via the controller IF 41 is stored. The size of the command is stored in the data size storage part 54, and the command is stored in the data buffer storage part 55. The interrupt control part 56 provides a reception interrupt when the command is written in the register 52.

Similarly, in the register 53, a command that is an instruction that is output from the engine CPU 8 via the CPU control IF 42 is stored. In the data size storage part 57, the size of the command that is output from the engine CPU 8 is stored. In the data buffer storage part 58, the command is stored. The interrupt control part 59 provides a reception interrupt when the command is written in the register 53.

The parameter analysis part 51 detects a reception of the command that is the instruction from the controller 5 via the controller IF 41, analyzes the size and the contents of the command, stored in the data size storage part 54 and the data buffer storage part 55, respectively, and determines the processing parameter(s).

(Operations of Communication Part 12)

A usual information transfer between the reading control part 1 and the reading part 2 is carried out by a transfer of a command via the communication part 12. When the reading part 1 is to receive information from the reading control part 2, the controller 5 writes the size of the command in the data size storage part 54 of the register 52 and writes the command in the data buffer storage part 55. The interrupt control part 56 notifies the engine CPU 8 of the reception completion via the CPU control IF 42 as a reception completion interrupt. The engine CPU 8 reads the size of the command and the command from the data size storage part 54 and the data buffer storage part 55 of the register 52, respectively. An information transfer from the reading part 2 to the reading control part 1 is carried out in the same or a similar way using the register 53.

According to the first embodiment, commands are previously defined as respective sets of data each having a size up to 32 bytes. When an image transfer instruction has been provided by the controller 5, the size of the command of the image transfer instruction is stored in the data size storage part 54 and the command is stored in the data buffer storage part 55. The parameter analysis part 51 detects the reception of the command by hardware, and analyzes for the contents of the command. The processing parameter(s) necessary for image processing is(are) uniquely determined from the contents of the command. Thus, the parameter analysis part 51 determines the processing parameter(s) necessary for image processing, and provides an instruction to the DMA part 13 to transfer by the DMA transfer method the determined processing parameter(s) from the page memory 15 to the IPU 23.

The contents of the command at this time may be, for example, information that indicates the front side or the back side of an original, color system information or color plane information (RGB, CMYK or the like), gradation property (1 bit per pixel, 8 bits per pixel or the like), resolution (a size change ratio, editing contents or the like), an image processing mode (characters, characters and photographs or photographs), and so forth. According to the information that indicates the front side or the back side of an original, the processing parameter(s) necessary for image processing is (are) uniquely determined.

Thus, the communication part 12 has functions of analyzing an image transfer instruction from the reading control part 1 to the reading part 2, determining the necessary processing parameter(s), and transferring by the DMA transfer method the determined processing parameter(s), and thus, it is possible to reduce the period of time required for setting the processing parameter(s).

(Internal Configuration and Functions of DMA Part 13)

Figure 6:
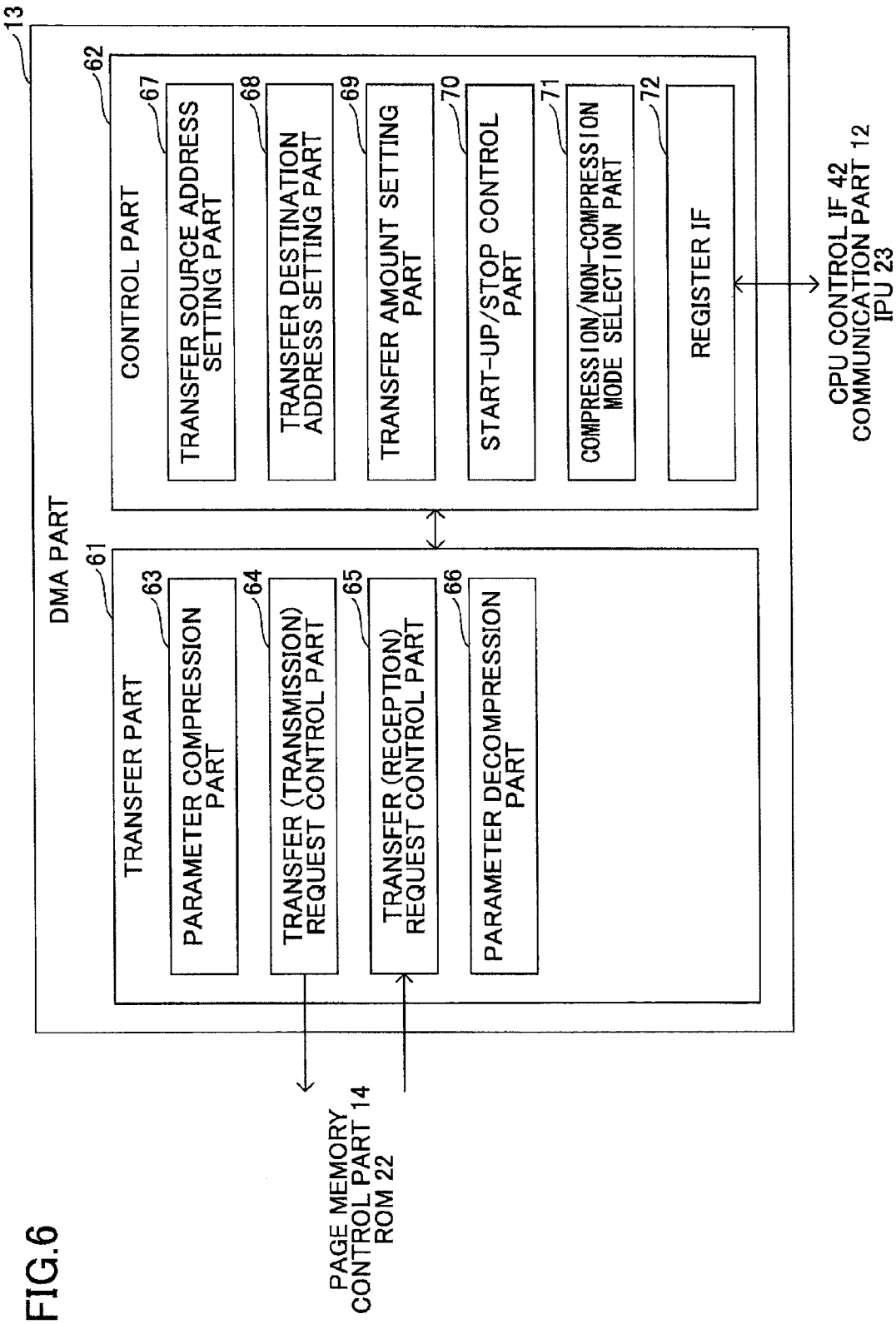
FIG. 6 is an internal configuration diagram of a DMA part.

Below, the internal configuration and functions of the DMA part 13 will be described. FIG. 6 is an internal configuration diagram of the DMA part 13.

The DMA part 13 includes a transfer part 61 and a control part 62. The transfer part 61 includes a parameter compression part 63, a transfer (transmission) request control part 64, a transfer (reception) request control part 65 and a parameter decompression part 66. The control part 62 includes a transfer source address setting part 67, a transfer destination address setting part 68, a transfer amount setting part 69, a start-up/stop control part 70, a compression/non-compression mode selection part 71 and a register IF 72.

The DMA part 13 carries out a transfer of the processing parameter(s) as a result of being controlled by the communication part 12 or the engine CPU 8. The control part 62 controls a transfer of the processing parameter(s), and the transfer part 61 carries out the transfer.

As described above, the processing systems are different for transferring the processing parameter(s) between a time of starting up and a time of providing an instruction to transfer an image. At a time of starting up, a transfer of the processing parameter(s) by the DMA transfer method is controlled by the engine CPU 8, the transfer (reception) request control part 65 receives the processing parameters from the ROM 22, and the transfer (transmission) request control part 64 provides the processing parameters to the page memory control part 14. At a time of providing an instruction to transfer an image, the transfer (reception) request control part 65 receives the processing parameter(s) from the page memory control part 14 and the transfer (transmission) request control part 64 provides the processing parameter(s) to the IPU 23. The parameter compression part 63 compresses the processing parameter(s) received from the transfer (reception) request control part 65 in real time, and transmits the compressed processing parameter(s) from the transfer (transmission) request control part 64. The parameter decompression part 66 decompresses the processing parameter(s) in real time in a case where the processing parameter(s) received from the transfer (reception) request control part 65 is compressed, and transmits the decompressed processing parameter(s) from the transfer (transmission) request control part 64.

In the transfer source address setting part 67, an address(es) from which the processing parameter(s) is received is(are) set, and, in the transfer destination address setting part 68, an address(es) to which the processing parameter(s) is(are) to be sent is(are) set. In the transfer amount setting part 69, a size of the processing parameter(s) to be transferred is set. The startup/stop control part 70 sets "start up" in a case where the processing parameter(s) is(are) to be transferred using the DMA part 13 and sets "stop" in a case where the processing parameter(s) is(are) to be transferred without using the DMA part 13. The compression/non-compression mode selection part 71 selects whether to carry out compression when transferring the processing parameter(s) and sets the selection result. The register IF 72 acts as an interface for transmitting/receiving information to/from the CPU control IF 42, the communication part 12 and the IPU 23.

(Operations of DMA Part 13)

In a case where the DMA transfer method is used when the power supply to the image reading apparatus 10 is started, the address(es) of the ROM 22 is(are) set in the transfer source address setting part 67, and the address(es) of the page memory 15 is(are) set in the transfer destination address setting part 68. The DMA part 13 transfers the processing parameter(s) from the ROM 22 to the page memory 15.

When an image transfer instruction has been provided by the controller 5, the address(es) of the page memory 15 is(are) set in the transfer source address setting part 67, and the address(es) of the register 43 of the IPU 23 is(are) set in the transfer destination address setting part 68. The DMA part 13 transfers the processing parameter(s) from the page memory 15 to the register 43 of the IPU 23.

According to the first embodiment, the compressor (parameter compression part 63) and decompressor (parameter decompression part 66) for the processing parameters are provided in the DMA part 13. At a time of starting the power supply to the image reading apparatus 10, the processing parameters are transferred by the DMA transfer method from the ROM 22 to the page memory control part 14. At this time, the processing parameters are compressed by the parameter compression part 63 in real time, and the compressed processing parameters are sent to the page memory control part 14. When an image transfer instruction has been provided by the controller 5, the processing parameter(s) is(are) transferred by the DMA transfer method from the page memory control part 14 to the IPU 23. At this time, the compressed processing parameter(s) is(are) decompressed by the parameter decompression part 66, and the decompressed processing parameter(s) is(are) transmitted to the IPU 23.

A specific compression coding method used for the compression and decompression may be any method as long as the method is of reversible data compression. Further, control of "on" and "off" of this function is possible, and the compression/non-compression mode selection part 71 is used to control "on" and "off" of this function. By compressing the processing parameter(s), the data amount of the processing parameter(s) is reduced, and thus, it is possible to reduce the amount of memory of the page memory 15. Further, it is possible to further reduce the period of time required for transferring the processing parameter(s).

(Processing and Control Timing)

Figure 7:
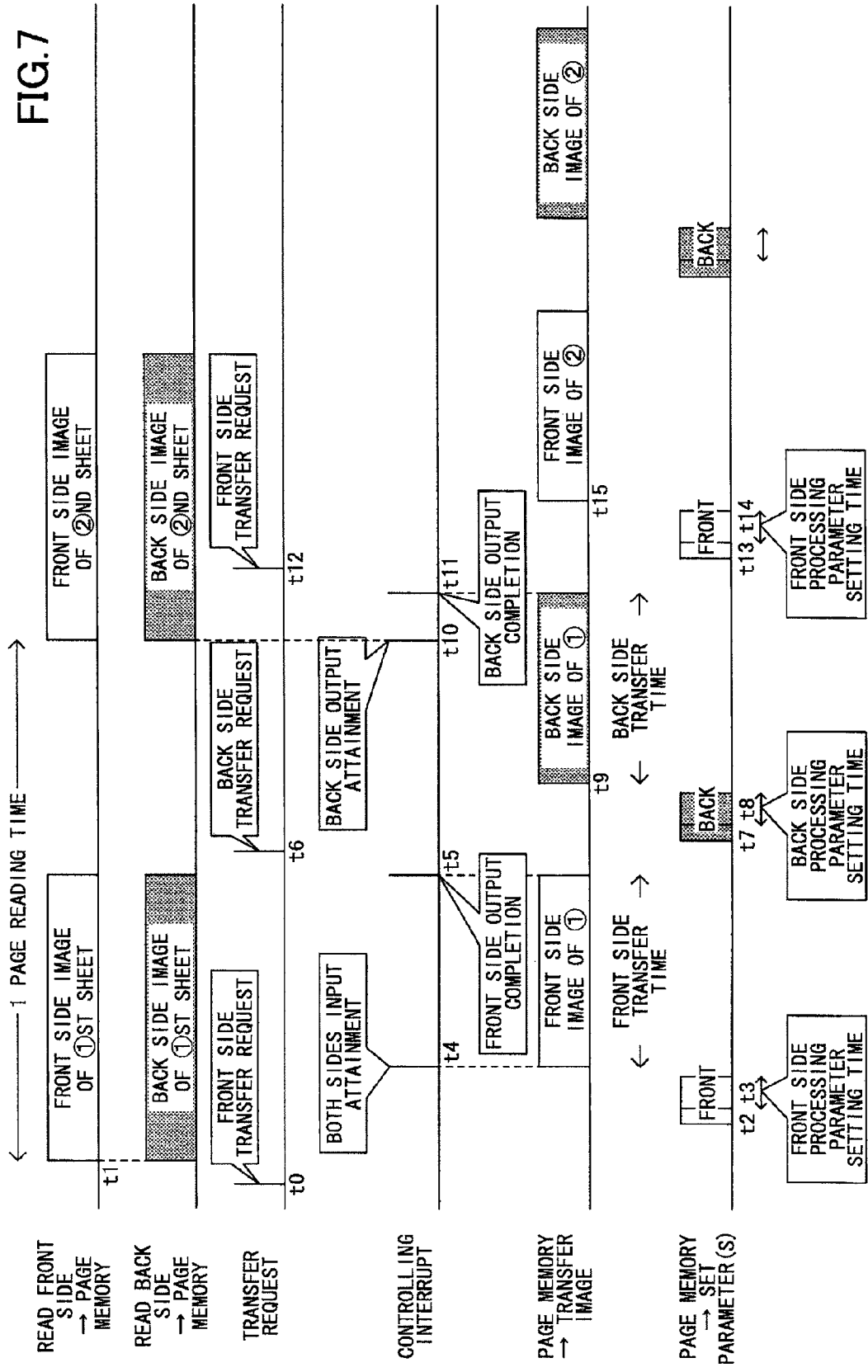
FIG. 7 is a double-sided original transfer control timing chart.

Next, processing and control timing of the image reading apparatus 10 will be described. FIG. 7 is a double-sided original transfer control timing chart. Below, it is assumed that an image transfer instruction has been provided.

At a time t0, the controller 5 provides an image transfer instruction for the front side. At a time t1, the front side reading device 16 and the back side reading device 17 read the front side and the back side of an original simultaneously. At a time t2, based on the image transfer instruction for the front side, the communication part 12 determines the processing parameter(s) for the front side, and transfers by the DMA transfer method the determined processing parameter(s) from the page memory 15 to the IPU 23. At a time t3, the processing parameter(s) for the front side is(are) set in the register 43.

At a time t4, when a predetermined number of lines (for example, 5 lines) of the read image(s) are input, the page memory control part 14 provides a "both sides input attainment interrupt" to the engine CPU 8. The "both sides input attainment interrupt" is provided for the purpose of improving the processing speed. Thus, the "both sides input attainment interrupt" is provided and thus a notification indicating that the predetermined number of lines of the read image(s) have been input to the page memory 15 is sent to the engine CPU 8, so that a timing of starting a transfer of the read image of the front side can be advanced as much as possible.

When the interrupt has been thus sent to the engine CPU 8, the transfer of the read image of the front side from the page memory 15 to the image processing part 11 is started. The image processing IF 32 of the page memory control part 14 reads the front side via the page memory control part 14 in synchronization with a line period, and outputs the read image data to the image processing part 11. After the transfer of the front side is completed, at a time t5, the page memory control part 14 provides a "front side output completion interrupt" to the engine CPU 8.

After detecting the "front side output completion interrupt", the engine CPU 8 notifies the main CPU 4 of the completion of the output of the front side, using a command. The controller 5 provides an image transfer request for the back side at a time t6. At a time t7, the communication part 12 detects the image transfer request for the back side, the parameter analysis part 51 determines the processing parameter(s) for the back side, and transfers by the DMA transfer method the processing parameter(s) for the back side from the page memory 15 to the register 43 of the IPU 23. At a time t8, the processing parameter(s) for the back side is(are) set in the register 43.

After the transfer of the read image of the back side is started at a time t9, the read image of the back side is output to the image processing part 11 in operations the same as or similar to those for the front side. The page memory control part 14 provides a "back side output attainment interrupt" to the engine CPU 8 at a time t10 when the transfer of the read image of the back side has reached a predetermined number of lines. A notification of the interrupt is sent to the main CPU 4, and the front side and the back side of the subsequent original are simultaneously read. Further, after the transfer of the back side is completed, the page memory control part 14 provides a "back side output completion interrupt" to the engine CPU 8 at a time t11.

The engine CPU 8 notifies the main CPU 4 of the "back side output completion interrupt", and the controller 5 provides an image transfer instruction for the front side of the subsequent original at a time t12. After the communication part 12 detects the image transfer instruction, the DMA part 13 reads the processing parameter(s) for the front side from the page memory 15 at a time t13, and transfer the processing parameter(s) for the front side to the register 43 of the IPU 23. At a time t14, the processing parameter(s) for the front side is(are) set in the register 43. At a time t15, the transfer of the read image of the front side of the subsequent original is started.

According to the first embodiment, in order to improve the speed of reading originals, a configuration is provided such that the period of time required for transferring the processing parameter(s) of the front side and the back side is reduced, and thus, the period of time required from the reading 1 page of an original to the outputting is reduced.

(Address Space of Page Memory)

Figure 8:
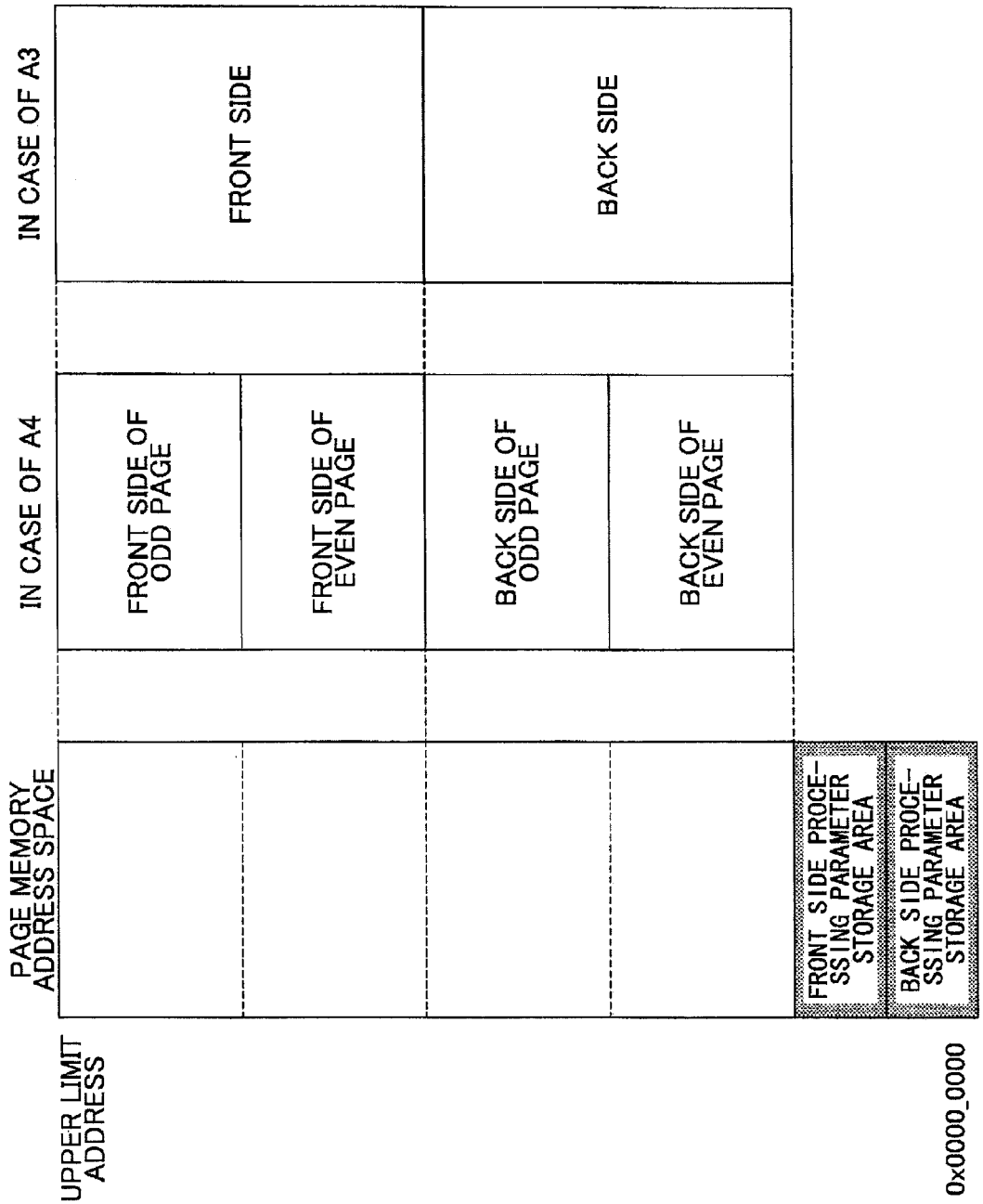
FIG. 8 illustrates an address space of a page memory.

Next, the address space of the page memory 15 will be described. FIG. 8 illustrates the address space of the page memory 15.

The page memory 15 stores not only read images of the front side and the back side, but also the processing parameters for the front side and the back side, as described above. The page memory 15 has a front side processing parameter storage area and a back side processing parameter storage area (for storing the processing parameter(s) for the front side and the processing parameter(s) for the back side, respectively), in addition to storage areas for read images, and the front side processing parameter storage area and the back side processing parameter storage area are not used for storing read images.

Further, how to use the addresses is different depending on the size of an original to be read. In any method to use the addresses, the processing parameter storage areas (the front side processing parameter storage area and the back side processing parameter storage area) are always kept.

In the first embodiment, the maximum original size is A3, and the area for two sheets of originals can be kept for a case of A4 that is a half of A3, as shown in FIG. 8.

(Control at Time of Initialization)

Figure 9:
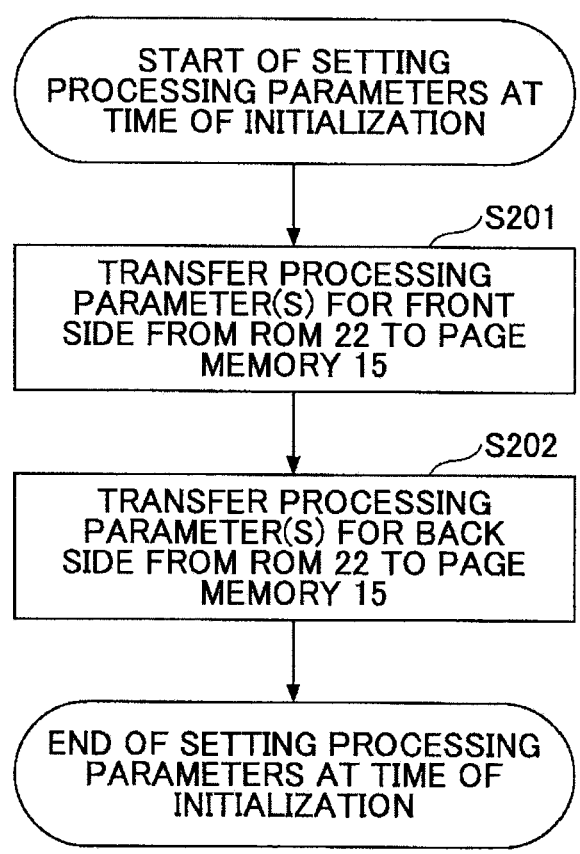
FIG. 9 is a flowchart of control at a time of initialization.

Below, control at a time of initialization (i.e., at a time of starting the power supply to the image reading apparatus 10, mentioned above, or at a time when only the reading part 2 has returned from an energy saving state) will be described. FIG. 9 is a flowchart concerning control at a time of initialization.

In step S201, as a result of being controlled by the engine CPU 8, the processing parameter(s) for the front side is(are) transferred from the ROM 22 to the page memory 15. At this time, the engine CPU 8 may control the DMA part 13 to carry out the transfer, or a DMA part included in the engine CPU 8 may carry out the transfer. Further, it is also possible that the DMA transfer method is not used, and the engine CPU 8 reads the processing parameter(s) from the ROM 22, and stores the read processing parameter(s) in the page memory 15 as mentioned above.

After the transfer of the processing parameter(s) for the front side is finished, the processing parameter(s) for the back side is(are) transferred in step S202. In a way the same as or similar to that for the front side, as a result of being controlled by the engine CPU 8, the processing parameter(s) for the back side is(are) read out from the ROM 22, is(are) transferred to the page memory 15, and thus, setting of the processing parameter(s) at a time of initialization is finished. Thus, as a result of the processing parameters being previously read out from the ROM 22 into the page memory 15, it is possible to transfer the processing parameter(s) at high speed when processing images.

(Control at Time of Transferring Image)

Figure 10:
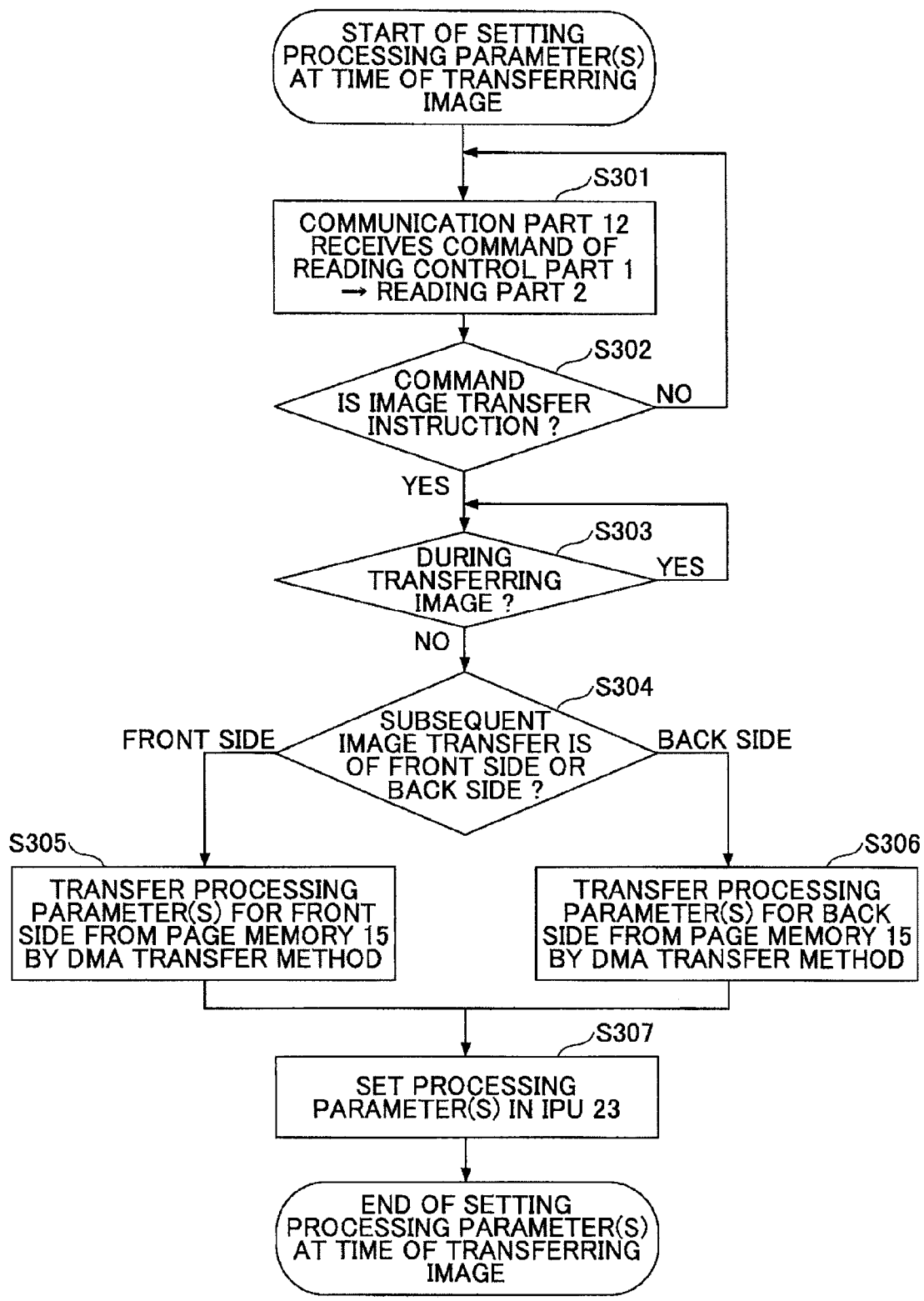
FIG. 10 is a flowchart of control at a time of transferring an image.

Next, control at a time of transferring an image will be described. FIG. 10 is a flowchart concerning control at a time of transferring an image. Below, it is assumed that an image reading instruction has already been provided in the image reading apparatus 10.

In step S301, the communication part 12 detects a command transmitted from the reading control part 1 to the reading part 2. In step S302, the communication part 12 analyzes the command. Then, in a case where the command is an image transfer instruction (step S302 YES), the process proceeds to step S303. In step S303, in a case where the command is thus received while an image is being transferred, the finish of the image transfer is waited for. In a case where the command is thus received while an image is not being transferred (step S303 NO), the process proceeds to step S304. In step S304, in a case where the image transfer instruction is one for the front side (step S304 "front side"), the process proceeds to step S305. In step S305, as a result of being controlled by the communication part 12, the processing parameter(s) for the front side is(are) transferred from the page memory 15 to the IPU 23 by the DMA transfer method. In step S304, in a case where the image transfer instruction is one for the back side (step S304 "back side"), the process proceeds to step S306. In step S306, as a result of being controlled by the communication part 12, the processing parameter(s) for the back side is(are) transferred from the page memory 15 to the IPU 23 by the DMA transfer method. Then, in step S307, the processing parameter(s) that has(have) been transferred from the page memory 15 is(are) stored in the register 43 included in the IPU 23, and thus, setting of the processing parameter(s) is finished.

The above-described control of FIG. 10 may be carried out as a result of a corresponding program stored in the memory 9 being executed by the engine CPU 8. Thus, analyzing an image transfer instruction that is an instruction to transmit the read image from the page memory 15 to the image processing part 11, and determining which of the processing parameters is to be used for the read image (step S304); and controlling the DMA part 13 to transfer the determined processing parameter by the DMA transfer method (step S305 or S306), may be carried out by the engine CPU 8 as a result of a corresponding program stored in the memory 9 being executed by the engine CPU 8. The memory 9 may be a removable type memory or a non-transitory information recording medium such as a CD-ROM (not shown) may be used to install the program into the memory 9 from the non-transitory information recording medium.

(Image Forming Apparatus 100 Including Image Reading Apparatus 10)

Figure 11:
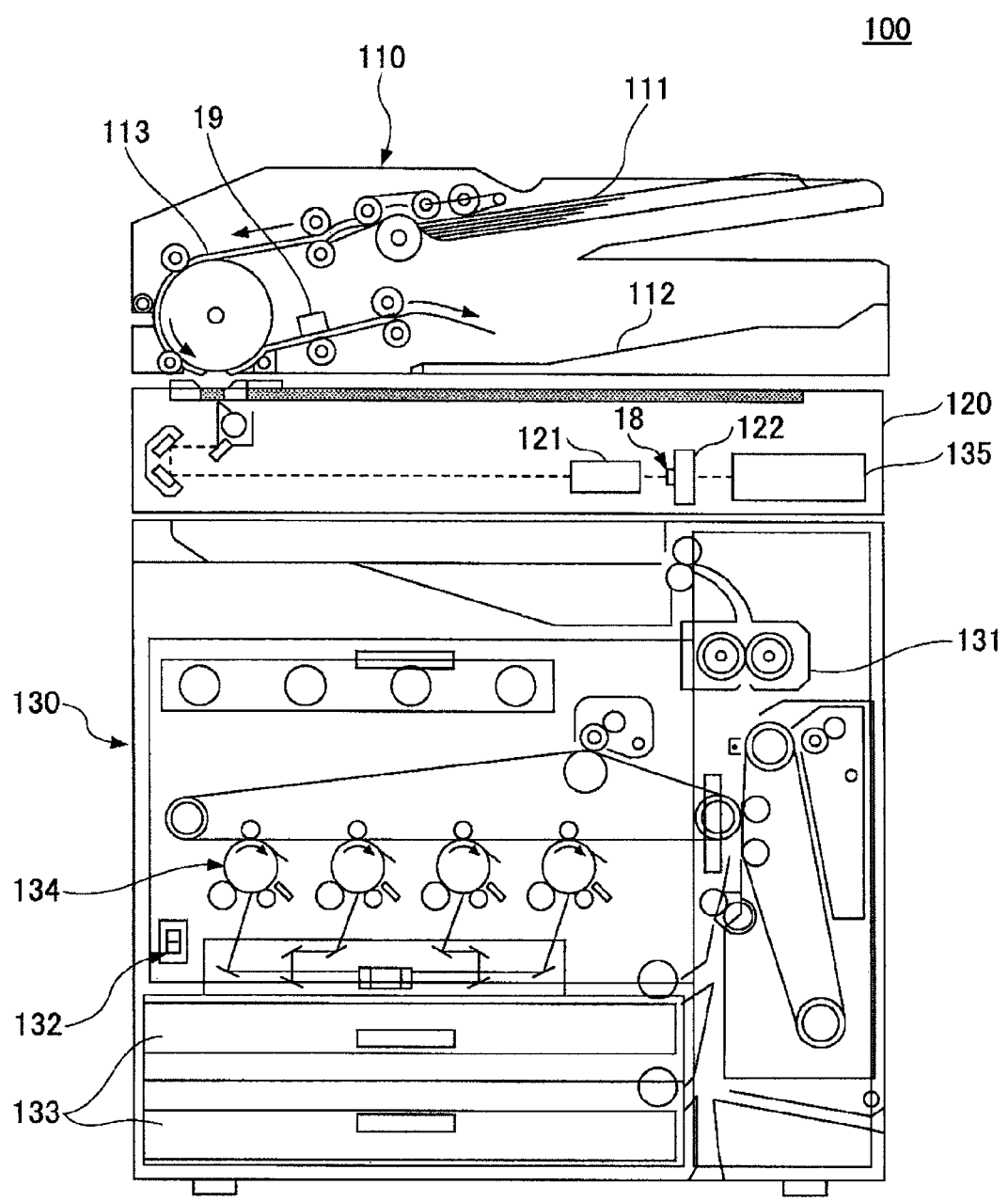
FIG. 11 shows the entirety of an image forming apparatus that includes the image reading apparatus.

Next, an image forming apparatus 100 that is typical (corresponding to the above-mentioned MFP except that it includes the above-described image reading apparatus 10 that reads both sides of an original will be described. FIG. 11 shows the entirety of the image forming apparatus 100 that includes the image reading apparatus 10.

The image forming apparatus 100 includes an Auto Document Feeder (ADF) 110, a reduced optical reading unit 120 and a printer unit 130. The ADF 110 is an auto document feeder unit of a sheet-through type. The reduced optical reading unit 120 is a reading unit of a reduced optical system using a CCD sensor. The printer unit 130 forms an image on a sheet of paper.

The ADF 110 includes, in addition to the above-mentioned CIS 19 (see FIG. 1), an original tray 111, a paper ejection tray 112 and a conveyance drum 113. The CIS 19 is a sensor for reading the back side of an original. The original tray 111 is a tray for placing an original(s). The paper ejection tray 112 is a tray to which an original from which an image(s) has been read is ejected.

The reduced optical reading unit 110 includes, in addition to the above-mentioned CCD 18 (see FIG. 1), a lens 121 and a sensor board unit 122. The lens 121 leads light of a xenon lamp into the CCD 18. The sensor board unit 122 has the CCD 18 and a signal processing part that processes a signal from the CCD 18 mounted thereon. The CCD 18 is a sensor for reading the front side of the original.

It is noted that, for the purpose of convenience in explanation, the elements/parts of the image reading apparatus 10 shown in FIG. 1 other than the CCD 18 and the CIS 19 are omitted in FIG. 11.

The printer unit 130 includes a fixing part 131, a power supply switch 132, paper supply trays 133, photosensitive members 134 and an operation board 135. The fixing part 131 fixes toners that have been transferred to a sheet of paper with heat and pressure. The power supply switch 132 starts and stops the power supply to the image forming apparatus 100. The paper supply trays 133 are trays on which sheets of paper for printing are placed. The photosensitive members 134 have electrostatic latent images formed thereonto as a result of being exposed by the above-mentioned laser diodes (driven by the LD driver 21 of FIG. 1), and cause the toners to adhere to the sheet of paper. The operation board 135 is used by a user to input instructions for reading images and forming images. It is noted that the specific method of forming an image on a sheet of paper (i.e., printing) in the printer apparatus 130 may be the same as a known method of a common laser printer, and thus, further explanation therefor will be omitted.

When an instruction to carry out duplex copying on an original placed on the original tray 111 has been input by the user, the CCD 18 and the CIS 19 simultaneously reads both sides of the original, respectively, while the original is being conveyed by the conveyance drum 113. The photosensitive members 134 form corresponding images on a sheet(s) of paper placed on the paper supply tray 133, and the sheet(s) of paper is(are) ejected after toners are fixed thereonto by the fixing part 131.

Thus, the image reading apparatus 10 is included in the image forming apparatus 100, and thus, it is possible to provide the image forming apparatus in which the period of time required from the reading images to the outputting (printing) is reduced.

(Second Embodiment)

A second embodiment will now be described. Returning to FIG. 4, according to the second embodiment, as mentioned above, the IPU 23 has the register 44 for storing the processing parameter(s) for the back side mounted thereonto, in addition to the register 43. The communication part 12 determines the processing parameters for the front side and the back side at a time of the first image transfer instruction being given. Then, after transferring and setting the processing parameters(s) for the front side in the register 43, the communication part 12 subsequently transfers and sets the processing parameter(s) for the back side in the register 44.

By this configuration, it is possible to carry out image processing of a sheet(s) of an original(s), subsequent to the first sheet, by using the processing parameters for the front side and the back side that have been set at the time of handling the first sheet. Thus, it is not necessary to further carry out a transfer of the processing parameter(s). Thus, it is possible to eliminate the period of time required for switching the processing parameter(s) from the front side to the back side and from the back side to the front side. Thus, it is possible to reduce the period of time required for the reading to the outputting.

(Variant of First or Second Embodiment)

In a case where the above-described functions of the first or the second embodiment are applied to an image reading apparatus that does not read the front side and the back side of an original simultaneously, it is not necessary to set the processing parameter(s) for the back side after the processing parameter(s) for the front side is(are) set in the IPU 23. At this time, the DMA transfer function may be made to be turned "off" by a setting. Thus, it is also possible to mount the above-described functions of the first or the second embodiment in such a type of an image reading apparatus that no function is provided for reading the front side and the back side of an original simultaneously, and thus, it may be possible to reduce the manufacturing costs.

Further, also in an image reading apparatus that can read the front side and the back side of an original simultaneously, it is not necessary to change the processing parameter(s) into those for the back side after the processing parameter(s) for the front side is(are) set, in a case where only one side of an original is read in the image reading apparatus. Thus, in a case where the parameter analysis part 51 has determined, as a result of analysis of a received command, that the received command is an image transfer instruction for the front side the same as a command that has been received previously, and thus, it is not necessary to change the processing parameter(s), it is possible to determine that a transfer of the processing parameter(s) by the DMA transfer method is not to be carried out. Thus, setting of the processing parameter(s) can be finished only by one time thereof, and thus, the reading speed is improved.

According to the embodiments, it is possible to provide the image reading apparatus, the image forming apparatus, the image reading method and the computer readable information recording medium by which it is possible to reduce the period of time required for obtaining the processing parameter(s), and thus, it is possible to carry out a sequence of a flow from image reading to outputting within a short period of time.

The image reading apparatus, the image forming apparatus, the image reading method and the computer readable information recording medium have been described above by the embodiments. However, the present invention is not limited to these specifically disclosed embodiments, and variations and modifications may be made without departing from the scope of the present invention.

The present application is based on Japanese Priority Application No. 2011-203735, filed Sep. 16, 2011, the entire contents of which are hereby incorporated herein by reference.

What is claimed is:

1. An image reading apparatus comprising:
a reading part that reads front and back sides of a sequence of originals;
a first storage part that stores read images that are thus read and plural processing parameters to be used for image processing of the read images; and
an image processing part that carries out the image processing on the read images using the plural processing parameters, wherein
the image processing part includes:
a parameter analysis part that analyzes an image transfer instruction that is an instruction to transmit the read image from the first storage part to the image processing part, and determines which of the processing parameters is to be used for the read image;

a DMA transfer control part that transfers the processing parameter, determined by the parameter analysis part, by a direct memory access transfer method, wherein the DMA transfer control part transfers the processing parameter concerning the read image from the first storage part to the image processing part by the direct memory access transfer method prior to the image processing of the read image by the image processing part, and the image reading apparatus further comprises, a second storage part that stores the plural processing parameters, wherein the plural processing parameters are read out from the second storage part and are stored in the first storage part, and the DMA transfer control part reads out the plural processing parameters from the second storage part by the direct memory access transfer method, compresses the plural processing parameters, and stores the plural processing parameters in the first storage part.

2. The image reading apparatus as claimed in claim 1, wherein the reading part simultaneously reads the front side and the back side of one sheet of the original, the first storage part stores the two processing parameters depending on reading characteristics of the front side and the back side, and the image transfer instruction includes information that indicates that the read image corresponds to the front side or the back side of the original.

3. The image reading apparatus as claimed in claim 1, wherein the image processing part has two processing parameter storage parts that store the processing parameters that have been transferred in the direct memory access transfer method by the DMA transfer control part, the processing parameter to be used for image processing of the front side is stored in one of the two processing parameter storage parts and the processing parameter to be used for image processing of the back side is stored in the other of the two processing parameter storage parts, and the processing parameter storage parts hold the processing parameters during the image processing of the sequence of originals.

4. The image reading apparatus as claimed in claim 1, wherein the plural processing parameters are read out from the second storage part and are stored in the first storage part, at a time of starting power supply to the image reading apparatus.

5. The image reading apparatus as claimed in claim 1, wherein the DMA transfer control part decompresses the compressed processing parameters, and transmits the decompressed processing parameters to the image processing part by the direct memory access transfer method.

6. An image forming apparatus comprising:
the image reading apparatus claimed in claim 1.

7. An image reading method in an image reading apparatus that comprises: a reading part that reads front and back sides of a sequence of originals; a first storage part that stores read images that are thus read and plural processing parameters to be used for image processing of the read images; an image processing part that carries out the image processing on the read images using the plural processing parameters; and a direct memory access part that transfers the processing parameter by a direct memory access transfer method, the image reading method comprising:

analyzing by a processor, an image transfer instruction that is an instruction to transmit the read image from the first storage part to the image processing part, and determining which of the processing parameters is to be used for the read image; and causing by a processor, the direct memory access part to transfer the determined processing parameter by a direct memory access transfer method, wherein in the transferring by the image processing part, the processing parameter concerning the read image is transferred from the first storage part to the image processing part by the direct memory access transfer method prior to the image processing of the read image by the image processing part, storing, by the image reading apparatus, the plural processing parameters in a second storage part;

reading out the plural processing parameters from the second storage part and storing the plural processing parameters in the first storage part, and reading out plural processing parameters by the DMA transfer control part from the second storage part by the direct memory access transfer method, compressing the plural processing parameters, and storing the plural processing parameters in the first storage part.

8. The image reading method as claimed in claim 7, further comprising:

reading simultaneously, by the reading part, the front side and the back side of one sheet of the original, storing by the first storage part the two processing parameters depending on reading characteristics of the front side and the back side, wherein the image transfer instruction includes information that indicates that the read image corresponds to the front side or the back side of the original.

9. A non-transitory computer readable information recording medium that stores an image reading program that is used in an image reading apparatus that comprises a reading part that reads front and back sides of a sequence of originals; a first storage part that stores read images that are thus read and plural processing parameters to be used for image processing of the read images; an image processing part that carries out the image processing on the read images using the plural processing parameters; and a direct memory access part that transfers the processing parameter by a direct memory access transfer method, the image reading program when executed by one or more processors performing:

analyzing an image transfer instruction that is an instruction to transmit the read image from the first storage part to the image processing part, and determining which of the processing parameters is to be used for the read image; and causing the direct memory access part to transfer the processing parameter concerning the read image from the first storage part to the image processing part by the direct memory access transfer method prior to the image processing of the read image by the image processing part, storing, by the image reading apparatus, the plural processing parameters in a second storage part;

reading out the plural processing parameters from the second storage part and storing the plural processing parameters in the first storage part, and reading out plural processing parameters by the DMA transfer control part from the second storage part by the direct memory access transfer method, compressing the plural processing parameters, and storing the plural processing parameters in the first storage part.

* * * * *